(12) United States Patent
Priestman et al.

(10) Patent No.: US 8,070,424 B2
(45) Date of Patent: Dec. 6, 2011

(54) FLOW CONTROL ARRANGEMENT

(75) Inventors: Geoffrey H. Priestman, Sheffield (GB); Timothy J. Scanlon, Derby (GB); John R. Tippetts, Sheffield (GB); Paul Wilson, Nottingham (GB)

(73) Assignee: Rolls-Royce PLC, London (GB)

( * ) Notice: Subject to any disclaimer, the term of this patent is extended or adjusted under 35 U.S.C. 154(b) by 497 days.

(21) Appl. No.: 12/320,770

(22) Filed: Feb. 4, 2009

(65) Prior Publication Data
US 2009/0226301 A1  Sep. 10, 2009

(30) Foreign Application Priority Data
Mar. 4, 2008 (GB) .................................. 0804002.4

(51) Int. Cl.
*F01D 17/00* (2006.01)
(52) U.S. Cl. .......... 415/145; 415/146; 415/147; 415/43; 137/810; 137/811
(58) Field of Classification Search .................. 415/145, 415/146, 147, 43; 137/180, 181; 60/324
See application file for complete search history.

(56) References Cited

U.S. PATENT DOCUMENTS

| | | | |
|---|---|---|---|
| 3,267,946 A | 8/1966 | Adams et al. | |
| 3,324,891 A | 6/1967 | Rhoades | |
| 3,521,657 A | 7/1970 | Ayers | |
| 4,308,718 A * | 1/1982 | Mowill | 60/772 |
| 4,817,863 A * | 4/1989 | Bragg et al. | 236/49.4 |
| 7,074,006 B1 * | 7/2006 | Hathaway et al. | 415/1 |

FOREIGN PATENT DOCUMENTS

| | | |
|---|---|---|
| GB | 2 272 924 A | 6/1994 |
| GB | 2 423 591 A | 8/2006 |
| WO | WO 2004/047997 A2 | 6/2004 |

OTHER PUBLICATIONS

European Search Report dated Jun. 29, 2010 for corresponding European Patent Application No. 09 250 278.0.

* cited by examiner

*Primary Examiner* — Thinh T Nguyen
(74) *Attorney, Agent, or Firm* — Oliff & Berridge, PLC (57) ABSTRACT

Provision of flow control arrangements which can be switched from high flow restriction to low flow restriction or vice versa are desirable. It is known to use switched vortex valves comprising a vortex chamber having a diverter portion which jets a through flow into either radial presentation to an outlet or tangential presentation with differential flow restrictions. Typically deflection is through cross flows presented from control ports as determined by mechanically actuated and controlled valves. Sensors are required to determine pressure differentials in order to actuate these moving part valves. By providing association between the control ports and an outlet path along with appropriate configuration and sizing of the flow regulators switching states can be provided through the cross flows presented via the flow regulators between the high and low through flow restriction. The flow regulators generally comprise orifice restrictors, diffusers/venturi arrangements or vortex throttles.

20 Claims, 6 Drawing Sheets

Fig.5(a)
Low Pressure

Fig.5(b)
Increased Pressure

FLOW CONTROL ARRANGEMENT

The present invention relates to flow control arrangements and more particularly to flow control arrangements utilised in gas turbine engines or other machines with pressure differentials between flows.

In a number of situations it is desirable to provide a device for giving a variable resistance to flow based upon pressure differentials across the device. Typically, pressure sensors will be provided either side of a valve with a controller and an actuator for the valve. In such circumstances, dependent upon the pressure differential, the valve will be proportionately opened or closed. Such an approach depends upon use of sensors, control electronics or otherwise and specific activation of the valve. In such circumstances there is a potential unreliability with regard to operation based upon failure of one of these components, that is to say the sensors, the controller, the actuator or the valve itself.

Figure 17:
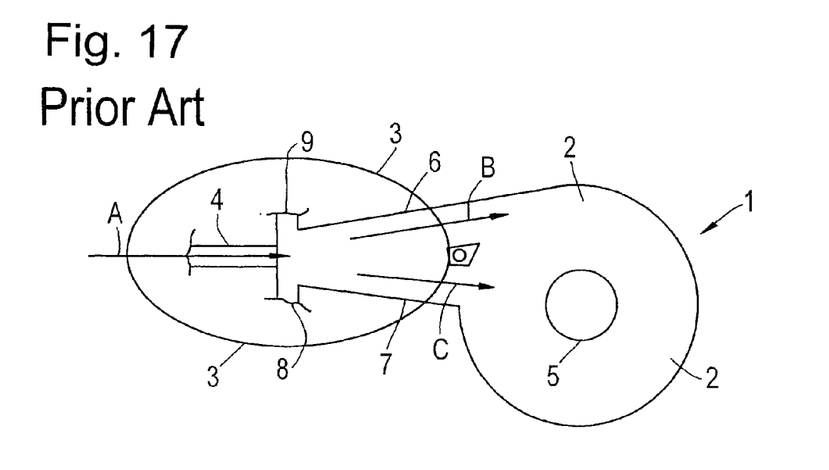
FIG. 17 shows a typical switched vortex valve (SVV) for an arrangement including a vortex chamber having a diverter portion with an inlet and an outlet.

It is also known to utilise fluidic devices such as switched vortex valves (SVV) and fluidic control circuits. FIG. 17 shows a typical switched vortex valve (SVV) for an arrangement 1 comprising a vortex chamber 2 having a diverter portion 3 with an inlet 4 and an outlet 5. The manner of operation of the arrangement 1 is such that fluid enters the fluid diverter through an inlet in the direction of arrowhead A. When the flow exits the diverter portion 3 a jet is formed. This jet will attach to one of the walls 6, 7 of the diverter portion 3 as a result of a Coanda effect. Dependent upon which wall 6, 7 the flow A attaches to will determine whether the diverter section causes entry into the vortex chamber principally in the direction of arrowhead B or arrowhead C. The inlet flow in the direction of arrowhead A can be switched between flows B, C through use of smaller cross flows presented through control ports 8, 9. Alternatively, cross flow can be extracted from the control point so that the main inlet or through flow A will again be sucked adjacent to or attach to one of the walls 6, 7. The cross flow provided through the control ports 8, 9 can be pulsed or continuous dependent upon required operation of the arrangement 1.

If flow is in the direction of arrowhead C it will be understood that the through flow in the direction of arrowhead C will cross the vortex chamber 1 radially and exit via the outlet 5. The outlet 5 is generally running perpendicular to the plane of FIG. 17. Such a flow regime is known as a normal state for the arrangement 1.

If the through flow is in the direction of arrowhead B that flow will enter the vortex chamber 2 with a high tangential velocity and so forms a strong vortex flow in the chamber 2 before leaving through the outlet 5. Such a flow regime is known as a vortex state. Due to the large pressure losses associated with the vortex flow the arrangement 1 shows and presents a relatively low resistance to flow in the normal state and a relatively high resistance to flow in the vortex state.

A further variation with regard to switched vortex valves (SVVs) relates to biasing the vortex chamber to one or other walls such that a single control port in such circumstances is utilised simply to switch between the normal state and the vortex state or vice versa.

Although switched vortex valves are known generally the cross flow is provided through the control ports using valving which incorporates moving parts. In such circumstances there are a number of modes of failure as indicated above with regard to sensors, the controller itself and the moving parts of the actuator and valve. Such arrangements can be unreliable or at least not meet reliability standards for certain usages. Furthermore, the control arrangements can be heavy and significantly add to costs. As indicated a switched vortex valve (SVV) needs a control cross flow to be applied to move it between the high resistance vortex state and a low resistance normal state. Flow control is achieved as indicated by a moving parts valve such as a solenoid and this introduces a failure mode unacceptable with regard to certain systems, particularly with regard to systems utilised in aircraft in relation to gas turbine engines. It will also be appreciated that the sensors utilised to determine switching of the switched vortex valve may also be subject to failure. Furthermore, by utilisation of moving parts valves, sensors and a control regime there will inherently be a lag in relation to operational control.

Aspects of the present invention relate to a flow control arrangement having an inlet and an outlet, and comprising a vortex chamber and a diverter portion to divert a through flow in use to enter the vortex chamber either tangentially or radially dependent in use upon a cross flow from a control port, the arrangement characterised in that the control port is associated with a flow regulator also coupled to the outlet to receive a proportion of the through flow and present the proportion of the through flow as the cross flow from the control port, the flow regulator configured to define flow conditions when the diverter portion switches the through flow between substantially tangential and substantially radial presentation to the vortex chamber.

Typically, the flow condition is a pressure ratio between the inlet and the outlet.

Generally, the flow regulator comprises an open flow regulator such as a diffuser or orifice restrictor or vortex throttle. Generally, the flow regulator is of a fixed configuration. Alternatively, the flow regulator may be of a variable configuration.

Normally, the diverter portion incorporates two control ports. Generally, the control ports are opposite each other. Possibly, one or both of the control ports may be closed. Possibly, the control ports may be electively closed or blocked.

Possibly, the diverter portion comprises a cascade of individual diverter portion elements with control ports interlinked. Possibly, where each diverter portion includes two control ports, one control port in each diverter portion is interlinked with only one control port in another diverter portion in the cascade. Possibly, each diverter portion in a cascade sequence from an inlet towards the vortex chamber has successively greater flow capacity.

Possibly, the control port is configured to provide pulsed cross flow. Alternatively, the control port is configured to provide a continuous cross flow.

Possibly, the cross flow is forced to become incident upon the through flow. Alternatively, the cross flow is drawn outwardly of the control port to draw or suck upon the through flow.

Possibly, the vortex chamber is configured in terms of incident position for the diverter portion to provide a bias towards a substantially tangential or substantially radial presentation of the through flow to the outlet.

Also in accordance with aspects of the present invention there is provided a gas turbine engine incorporating a flow control arrangement as described above.

Possibly, the flow control arrangement is between a bypass duct and an engine core. Alternatively, the flow control arrangement is between a bypass duct and a ventilation path within the gas turbine engine. Possibly, the flow control arrangement is between a high pressure source and a flow over an aerofoil of a gas turbine engine.

Further alternatively in accordance with aspects of the present invention there is provided a reciprocating engine including a flow control arrangement as described above.

Possibly, the flow control arrangement is between an exhaust for the reciprocating engine and an exhaust conduit from the reciprocating engine.

Aspects of the present invention will now be described by way of example only with reference to the accompanying drawings, in which.

Aspects of the present invention provide a flow control arrangement in which a vortex chamber is utilised in order to define two different levels of flow resistance to a compressible fluid through flow. The approach taken utilises a diverter portion incorporating at least one operative control port but typically with two control ports provided to enable the designer to choose the particular pressure ratio at which switching between the resistance levels occurs. The switching between the high (vortex) and low (normal) resistance states can be in either direction, that is to say in response to a progressively increasing pressure drop either switching from high resistance to low resistance or switching from low resistance to high resistance.

Aspects of the present invention provide an arrangement in which as indicated a vortex chamber is utilised to define effectively a switched vortex valve with control ports connected to and associated with output from the control valve or vortex chamber. By utilising combinations of diffusers, restrictors and vortex throttles in a flow line between the control port and the downstream output from the vortex chamber it is possible to create desired configurations for a chosen switch-over between normal low resistance and high vortex resistance states for the arrangement.

Figure 1:
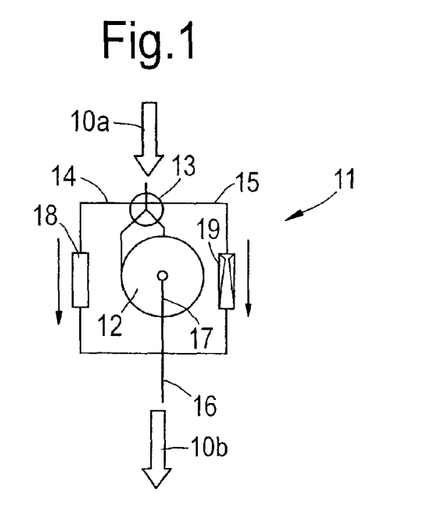
FIG. 1 is a symbolic illustration of a first flow control arrangement in accordance with aspects of the present invention.

FIG. 1 provides a symbolic illustration of a first embodiment of a flow control arrangement 11 in accordance with aspects of the present invention. The arrangement 11 includes a vortex chamber 12 which defines a switched vortex valve with a diverter portion 13. The diverter portion 13 incorporates control ports 14, 15 which are associated through respective control paths to a downstream output 16 of the arrangement 11. The downstream output 16 is associated with an output 17 from the vortex chamber 12.

In accordance with aspects of the present invention respective control paths to the control ports 14, 15 include flow regulator elements. In the illustration provided these flow regulator elements comprise, as symbolically depicted, an orifice restrictor 18 and a diffuser 19 or as will be described later a vortex throttle.

With the configuration of a flow arrangement 11 as depicted in FIG. 1 it will be understood that there are two control ports 14, 15 and in such circumstances a bi-stable condition for the vortex valve created by the diverter portion 13 and the chamber 12 is provided. For example if flow in the control port 14 exceeds the flow in control port 15 by a sufficient amount the main through flow through the arrangement 11 will be sucked into the high pressure side of the chamber 12 and therefore create a vortex state with relatively high flow resistance. If the flow in control port 15 exceeds that in control port 14 by a sufficient amount the main through flow through the arrangement 11 will be sucked into the normal or relatively low resistance radial presentation of a through flow at the output 17.

The flow characteristics of restrictor orifice and diffuser type flow regulator elements are well known. In such circumstances it is known that due to pressure recovery in a diffuser that a diffuser passes much more flow than a restrictor at low pressure ratios but reaches a choking flow at a much lower pressure ratio. Thus by connecting an appropriately sized diffuser and orifice restrictor to the respective ports 14, 15 a designer can control pressure ratios at which an arrangement 11 switches between low normal state flow with radial presentation of flow to the output 17 and high vortex resistance state flow with tangential presentation of flow to the output 17.

Figure 16:
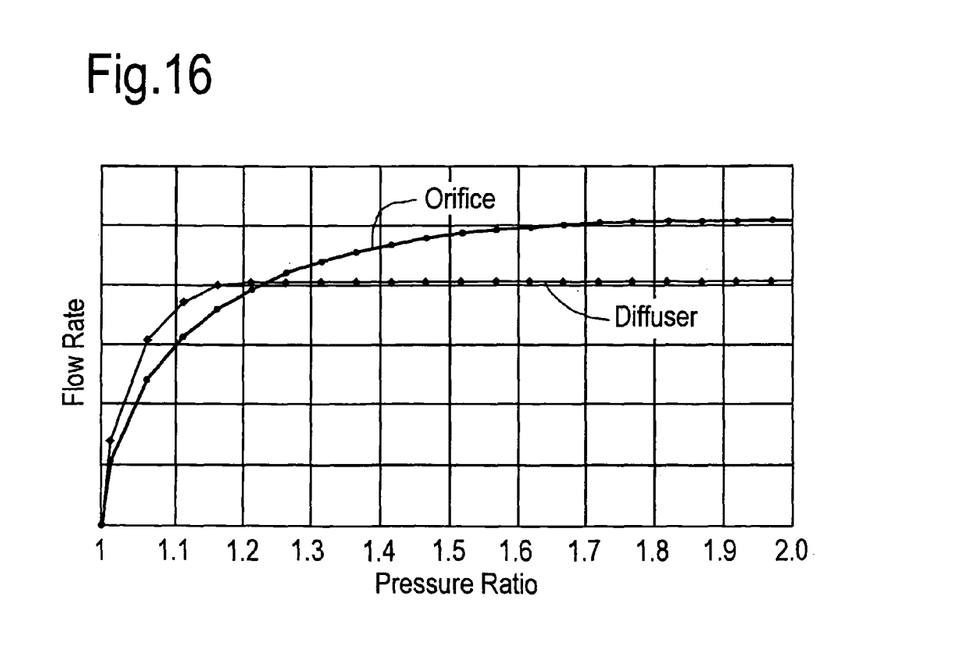
FIG. 16 provides a graphic representation of typical non-dimensionalised flow rates to pressure ratios for diffuser and orifice restrictor arrangements used as flow regulators.

FIG. 16 provides a graphic representation of typical non-dimensionalised flow rate to pressure ratios for diffuser and orifice restrictor flow regulator elements. In such circumstances in the arrangement depicted in FIG. 1 it will be understood that flow in control port 14 would exceed that in control port 15 with the diffuser at pressure ratios in the order of 1.2 and greater. By choosing a relatively larger orifice restrictor and a diffuser with a larger area ratio the pressure ratios can be further reduced for switch-over. By choosing a smaller orifice restrictor the pressure ratio for switch-over can be increased. In such circumstances with the first embodiment of a flow arrangement 11 as depicted in FIG. 1 it will be understood that a configuration is achieved where there is a switch from a low resistance to flow to a high resistance to flow as the pressure ratio across the arrangement increases.

Figure 2:
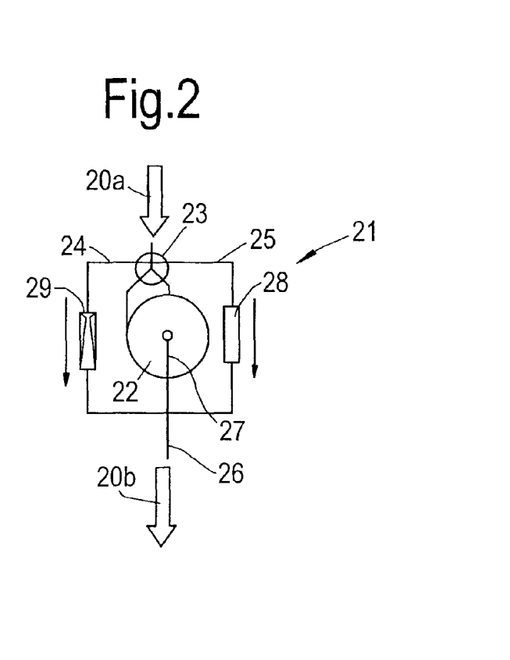
FIG. 2 is a symbolic illustration of a second control arrangement in accordance with aspects of the present invention.

FIG. 2 provides an illustration of a second embodiment of aspects of the present invention. A flow control arrangement 21 again includes a vortex chamber 22 associated with a diverter port 23 with respective control ports 24, 25. The control ports 24, 25 are associated with flow regulators in the form of a diffuser 29 and orifice restrictor 28. The flow regulators 28, 29 are reversed such that in the arrangement 21 depicted in FIG. 2 a switch occurs between a high resistance to flow to a low resistance to flow as the pressure ratio increases across the arrangement 21. As will be recalled this switch between high resistance and low resistance is dependent upon a cross flow from the diverter portion directing a through flow 20 either radially or tangentially towards the output 27. The through flow 20 downstream of the output 27 is in a through flow outlet 27 associated with the flow regulators 28, 29 to present the appropriate cross flow pressure at the control ports 24, 25 to achieve the desired switching between high and low resistance to flow.

Figure 3:
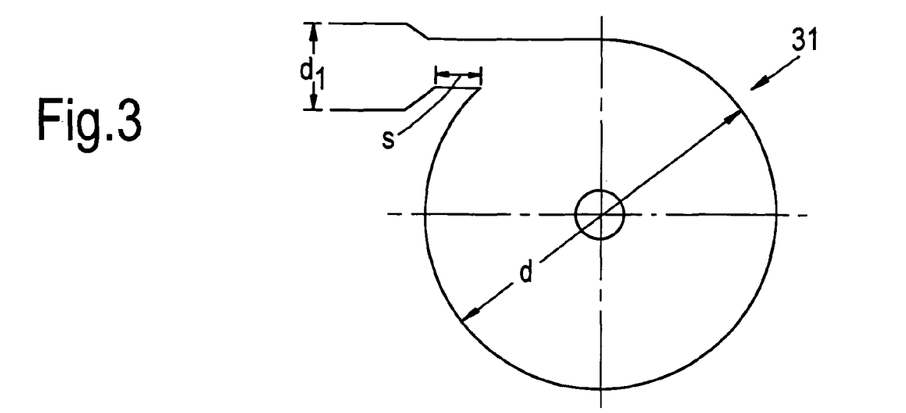
FIG. 3 is a symbolic illustration of a vortex throttle in accordance with aspects of the present invention.

To extend the pressure ratio range over which switching of arrangements 11, 21 is possible it will be understood that the diffuser 19, 29 could be replaced by another flow regulator device such as a vortex throttle. Such vortex throttles are again vortex chambers similar to that used with regard to the switched vortex valve combination of a vortex chamber 12, 22 and a diverter portion 13, 23 but with a single, tangential, inlet. FIG. 3 provides a schematic illustration of such a vortex chamber 31.

Vortex chambers as flow regulators generally pass a lower flow than an orifice restrictor at low pressure ratios but choke at higher pressure ratios than a simple orifice. In such circumstances again through appropriate choice of orifice restriction flow regulators and vortex throttle flow regulators designs and configurations can be achieved to provide a switch-over point between low resistance and high resistance in flow control arrangements in accordance with aspects of the present invention.

In the above circumstances three generally known flow regulator elements in the form of orifice restrictors, diffusers and throttle vortex chambers can be used in various combinations and sizes to achieve the desired flow control in an arrangement in accordance with aspects of the present invention.

Figure 4:
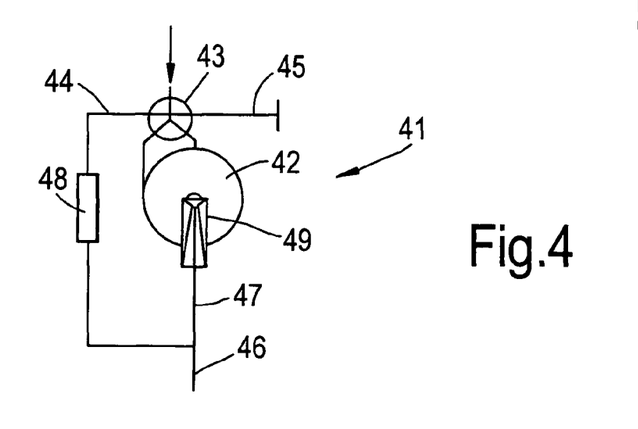
FIG. 4 provides a symbolic illustration of a mono-stable flow control arrangement in accordance with aspects of the present invention.

A further alternative is to provide a mono-stable version of a switched vortex valve within a flow control arrangement in accordance with aspects of the present invention. In such circumstances the flow diverter element within the arrangement is biased to preferably present flow to the radial inlet of the vortex chamber and thus maintain the device in a low resistance state in the absence of a flow control. Without provision of a cross flow from a control port the arrangement will provide low resistance to through flow. However, a control port is provided at least to one side of the diverter portion in order to provide switching between high and low resistance conditions for the arrangement. Generally a diffuser is fitted to an output from the arrangement and the control port attached to a higher resistance diverter control port as well as downstream of the diffuser. The orifice restrictor flow control element may be replaced by a vortex throttle chamber if required. FIG. 4 provides a symbolic illustration of such a mono-stable arrangement 41 with regard to aspects of the present invention. Thus as can be seen a vortex chamber 42 is presented with an output 47 with a diffuser 49 extending to a through flow output 46. A control port 44 of a diverter portion 43 is associated with an orifice restrictor flow element coupling the output 46 with the control port 44. The other control port 45 is either blocked or in some instances may be non-existent or electively switched from open to blocked or closed dependent upon requirements. When open of course the control port 45 may itself be associated with another flow regulator in the bi-stable configurations as depicted with regard to FIGS. 1 and 2. The arrangement 41 provides at low pressure ratios that the pressure loss in the vortex chamber 42 and outlet diffuser 49 is low and little or no flow will pass through the control port 44. As pressure ratios increase within the arrangement 41, the outlet diffuser 49 will choke and the pressure in the vortex chamber 42 will increase considerably above the downstream pressure. This will drive a larger control flow resulting in switching of the device into a high resistance state.

Figure 5A:
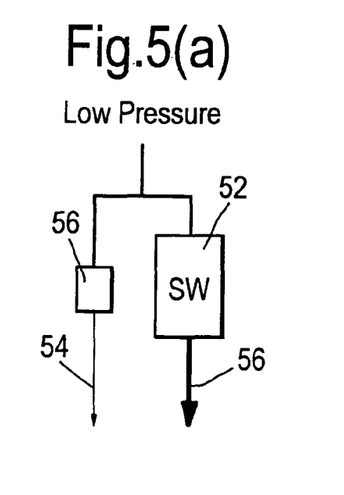
FIG. 5 is a schematic illustration with regard to pressure differentials and response by a flow control arrangement.

FIG. 5 provides schematic illustrations with respect to operation of the arrangement 41 depicted in FIG. 4. Thus, with regard to FIG. 5a the arrangement is biased to a non-vortex or normal state with relatively low resistance. In such circumstances the outlet is unchoked and the flow 56 is relatively large whilst the cross flow 54 through a flow regulator 58 is below a switching threshold for the arrangement.

Figure 5B:
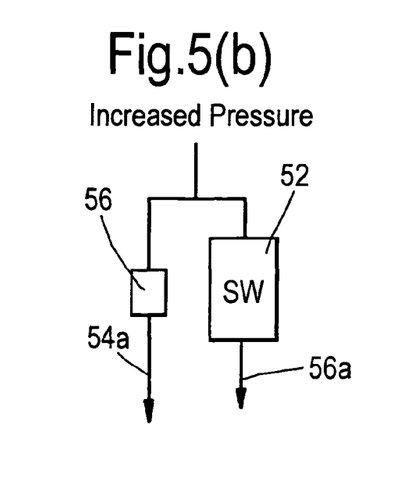

In FIG. 5b through flow pressure is increased such that a switching point occurs. In such circumstances the outlet 56a through the vortex chamber 52 chokes and pressure inside the chamber 52 increases disproportionately such that a greater fraction of flow is presented through the flow regulator 58 in terms of control flow 54a. This control flow 54a is presented as a cross flow within a diverter arrangement or portion as described previously in order to force the arrangement into a vortex high flow resistance state. In such circumstances it will be appreciated that there is a switch between low through flow resistance as depicted in FIG. 5a and higher through flow resistance as depicted in FIG. 5b.

In view of the above it will be appreciated that as indicated previously flow control arrangements in accordance with aspects of the present invention can be designed to operate either from low to high resistance or high to low resistance. The arrangements 11, 41 as depicted respectively in FIGS. 1 and 4 create a low-to-high resistance switch as pressure ratio increases. The arrangement 41 is a so-called mono-stable arrangement with an outlet diffuser and an orifice restrictor flow control to the control port 44. The arrangement 11 is a bi-stable flow control arrangement in which respective control ports 14, 15 have a diffuser and an orifice restrictor as flow regulators in order to provide the switch-over at particular desired pressure ratios between a low normal resistance and a high vortex resistance state.

FIG. 2 illustrates a bi-stable flow control arrangement in accordance with aspects of the present invention in which resistance is provided by the flow control arrangement from a high resistance to a low resistance dependent upon pressure ratio increases.

It will be appreciated, in accordance with aspects of the present invention, that by utilisation of flow regulators in relation to the control ports which present cross flows to a through flow, as indicated there is deflection of the through flow to provide tangential or radial presentation to an outlet and therefore variations and switching between normal low resistance flow and vortex high resistance flow can be achieved.

FIGS. 6 to 10 provide further examples in symbolic depictions of alternative arrangements to provide flow control in accordance with aspects of the present invention. It will be appreciated other configurations may also be achieved.

Figure 6:
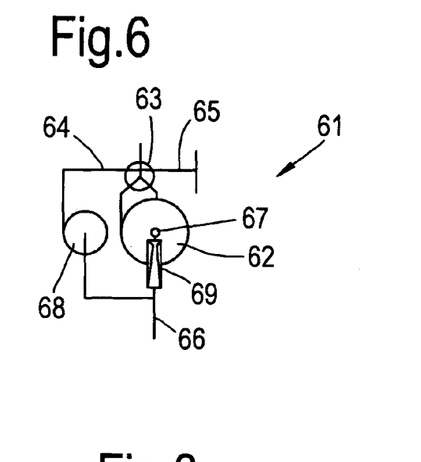
FIG. 6 is a schematic illustration of a mono-stable flow control arrangement in accordance with aspects of the present invention incorporating a vortex throttle flow restrictor in accordance with aspects of the present invention.

In FIG. 6 a mono-stable flow control arrangement 61 is provided in which a vortex chamber 62 is associated with a diverter portion 63 in order that a through flow is jetted into the chamber 62. As previously control ports 64, 65 are provided but with control port 65 electively or permanently blocked such that operation of the arrangement 61 is through the control port 64. The vortex chamber 62 as indicated previously is generally biased towards radial flow to an output from the chamber 62 in normal operation. It is by the control port 64 providing a cross flow within the diverter portion 63 that displacement of the through flow to the tangential presentation of the flow to a wall surface of the chamber 62 causes a vortex state and therefore high resistance to flow to be developed.

In comparison with the arrangement 41 depicted in FIG. 4 the arrangement 61 incorporates a vortex throttle 68 to couple the control port 64 with a downstream outlet 66 from the chamber 62. The chamber 62 is also associated with an outlet diffuser 69. In such circumstances, as described with regard to FIG. 4 at normal pressures flow through the diverter portion 63 will be presented radially to the outlet 67 and relatively low through flow resistance provided. However, as pressure increases in the through flow the relative flow regulation provided by the diffuser 69 and the vortex throttle 68 will switch in order that there is a cross flow presented by the control port 64. This cross flow will deflect the through flow to tangential presentation to a wall surface of the chamber 62 such that vortex flow will be created within the chamber 62. This vortex will create a step change in flow resistance in the arrangement 61 and therefore an effective switched operation.

Figure 7:
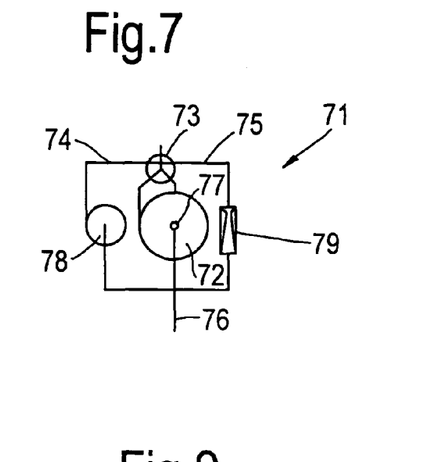
FIG. 7 is a symbolic illustration of a bi-stable flow control arrangement in accordance with aspects of the present invention incorporating a diffuser and a vortex throttle flow regulator.

FIG. 7 provides a symbolic illustration of a flow control arrangement 71 in accordance with aspects of the present invention. The arrangement 71 is similar to that depicted with regard to FIG. 1 above except the orifice restrictor flow regulator 18 as depicted in FIG. 1 is replaced by a vortex throttle 78. In such circumstances a diffuser 79 is provided such that the combination of the throttle 78 and the diffuser 79 provide respective cross flow regulators to control ports 74, 75. The control ports 74, 75 are associated with a diverter portion 73 associated with a vortex chamber 72 as described above in order to define a switched vortex valve combination. The respective throttle and orifice restrictor couple the control ports 74, 75 with a downstream outlet 76 from an outlet 77 from the chamber 72. The arrangement 71 is a bi-stable arrangement such that through the pressure ratio differentials and flow rate controls provided by the respective flow regulators 78, 79 switching between normal radial flow to the outlet 77 and tangential vortex flow to the outlet 77 is achieved.

Figure 8:
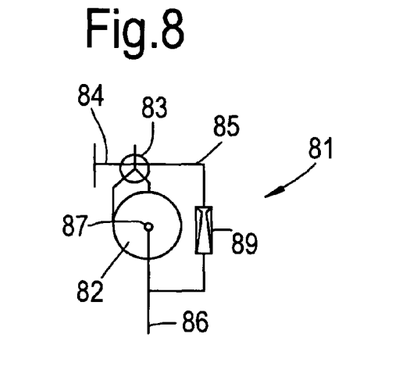
FIG. 8 is a symbolic illustration of a mono-stable flow control arrangement utilising a diffuser flow regulator.

As indicated above an alternative to switching from normal low resistance to high resistance is to provide in a biased state high flow resistance and switching to a low resistance state. As indicated differences between high resistance flow and low resistance flow within a vortex chamber is achieved through deflecting through flow either into radial association with an outlet or tangential flow into a vortex creating greater resistance. In such circumstances as depicted in FIG. 8 a mono-stable flow control arrangement 81 in accordance with aspects of the present invention is provided. Within the arrangement 81 it will be understood a vortex chamber 82 is configured and sized in order to be biased towards tangential flow from a diverter portion 83. In such circumstances the jet provided by the diverter portion 83 in normal pressure conditions will present the jet to be attached to a wall surface of the chamber 82 such that there is tangential flow and a vortex created within the chamber 82 and so high resistance to through flow. As depicted control ports 84, 85 are provided. In the illustration depicted control port 84 is blocked either permanently or electively in order to create the configuration as depicted in FIG. 8. It will also be understood that the control port 84 may be completely removed as the arrangement 81 depends upon cross flow created through the control port 85 for switching operation. The control port 85 is associated with a diffuser 89 which is also coupled downstream of an outlet 87 at an outlet portion 86. As described above in terms of flow characteristics for pressure ratio at a certain pressure ratio the diffuser 89 will present a cross flow through the control port 85 to a through flow through the arrangement 81. This cross flow will deflect, in the embodiment depicted in FIG. 8, the normal tangential and therefore vortex flow within the chamber 82 to a radial flow towards the outlet 87. Such radial flow will have lower resistance and therefore the arrangement 81 when a cross flow is presented by the control port 85 will switch from a high flow resistance to a low flow resistance configuration.

Figure 9:
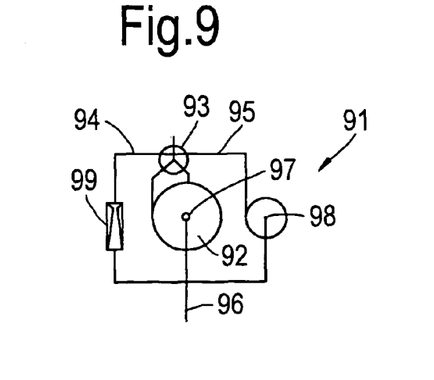
FIG. 9 is a symbolic illustration of a bi-stable flow control arrangement in accordance with aspects of the present invention combining a diffuser and a vortex throttle flow regulator.

FIG. 9 provides a bi-stable flow control arrangement in accordance with aspects of the present invention and depicted in symbolic form. The arrangement 91 is reciprocal to that depicted above with regard to FIG. 7 in that there is an inversion of the positions of the respective diffuser 99 and vortex throttle 98. Other configurations are similar. Thus, a vortex chamber 92 is associated with a deflector or diverter portion 93. The deflector portion 93 has control ports 94, 95 which as indicated above provide switching between high flow resistance and low flow resistance. The vortex throttle 98 and the diffuser 99 act as flow regulators such that through their relative configuration and size and response to flow at pressure ratios the cross flows presented by the control ports 94, 95 can be adjusted to deflect a through flow through the arrangement 91 from an inlet associated with the deflector portion 93 to an outlet 97 and subsequently an outlet path 96. The outlet path 96 as previously is associated with couplings between the control ports 94, 95 via the respective flow regulators created by the diffuser 99 and the vortex choke 98.

Figure 10A:
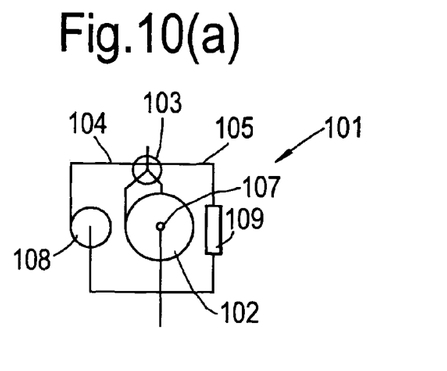
FIG. 10 provides symbolic illustrations of alternate flow control arrangements for respective normal state and vortex state operation by providing combinations of a restrictor flow regulator and a vortex throttle flow regulator associated with respective control ports in a diffuser portion.
Figure 10B:
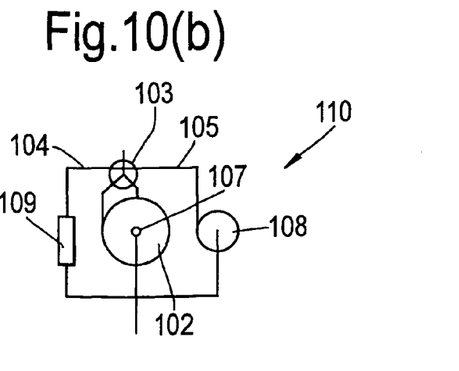

To complete the examples of reciprocal pairings of arrangements such as arrangement 11 in FIG. 1 and arrangement 21 in FIG. 2 along with arrangement 71 in FIG. 7 and arrangement 91 in FIG. 9, it will be appreciated as depicted in FIG. 10 arrangements 101, 110 can be provided. For illustrative purposes similar reference numerals have been used with regard to the components of the arrangement 101, 110. Thus, a vortex chamber 102 is associated with a diverter portion 103 which in turn presents respective control ports 104, 105 to a through flow presented to the arrangement 101, 110. The diverter portion 103 as illustrated previously provides a jet to the chamber 102 in order that the through flow can either be presented radially to an outlet 107 or tangentially in order to create a vortex within the chamber 102. Deflection of the through flow as described previously is achieved through cross flows presented by the control ports 104, 105.

The arrangement 101 provides a condition where the arrangement switches from low flow resistance to high flow resistance. The arrangement 110 provides a configuration in which the arrangement 110 switches from high flow resistance to low flow resistance. This variation in configuration is achieved through the respective flow regulators associated with the control ports 104, 105 being matched in terms of their flow response to pressure ratios to present cross flows as required. Thus, as depicted in FIG. 10a the arrangement 101 has a vortex throttle 108 associated with the control port 104 and an orifice restrictor 109 associated with the control port 105. Arrangement 110 is oppositely configured such that the vortex throttle 108 is associated with the control port 105 whilst the orifice restrictor 109 is associated with the control port 104. In such circumstances as described previously through flow will be variously deflected to low or high flow resistance dependent upon requirements.

The flow control arrangements 11, 21, 41, 51, 61, 71, 81, 91, 101, 110 can be considered as operable switches within a fluid switching arrangement. In such circumstances arrangements of these operative switches can be provided to provide a desired logic response to pressure ratio changes in a system. As the arrangements in accordance with aspects of the present invention include no moving parts it will be appreciated that high reliability is achieved. However, and where desirable or practicable, it will also be understood that as indicated above bi-stable flow control arrangements can be achieved by configuration of the vortex chambers to bias towards low or high flow resistance with one control port omitted or blocked permanently or electively. It may be possible to provide a biased vortex chamber to low or high flow resistance which also retains two control ports. One control port to switch away from the biased low or high flow resistance and the other control port to further reinforce the bias if required. It will also be understood with respect to the reciprocal flow control arrangements, that is to say arrangement 11 with arrangement 21, arrangement 71 with arrangement 91 and arrangement 101 and arrangement 110 the respective couplings to the control ports may include valve diverters which can be manually set as required in order to create from a generic arrangement structure one or other of the arrangements such that a common unit can be provided and then set as required for a particular installation. Providing elective switching between the configurations will normally not be required and as indicated above through the actuation mechanisms for such elective switching may create reliability problems.

As indicated flow control arrangements can be considered as operative switches within a switch arrangement such that arrangements of low to high flow resistance switching and arrangements of high to low flow resistance switching can be provided in parallel to create desirable flow characteristics from an inlet to an outlet in flow control arrangements. In such circumstances analysis of the respective flow regulators associated with the control ports as well as the responsiveness at particular pressure ratios would be required to achieve the desired results.

It will be understood that in some circumstances the strength of the cross flow to enable deflection into the respective normal radial presentation to the outlet and tangential vortex presentation to the outlet in a switched vortex valve in accordance with aspects of the present invention must be considered. If the cross flow is relatively weak it will be appreciated that there will be little if any effective deflection of a powerful through flow in a flow control arrangement. In such circumstances it is possible to provide an effective piloted diverter arrangement comprising a cascade of respective diverter portions to amplify the cross flow and therefore effective deflection flows in the diverter portion formed by the cascade. It will be understood in such cascades a number of diverter portions will be arranged in series. The output from the first diverter portion as a jet will be used to provide a cross flow control to a control port of the next diverter portion in the series which will then control a greater through flow in a subsequent diverter portion. This approach will provide amplification in terms of the cross flow to enable switching in terms of deflection of a more powerful main cross flow in accordance with aspects of the present invention.

Figure 11:
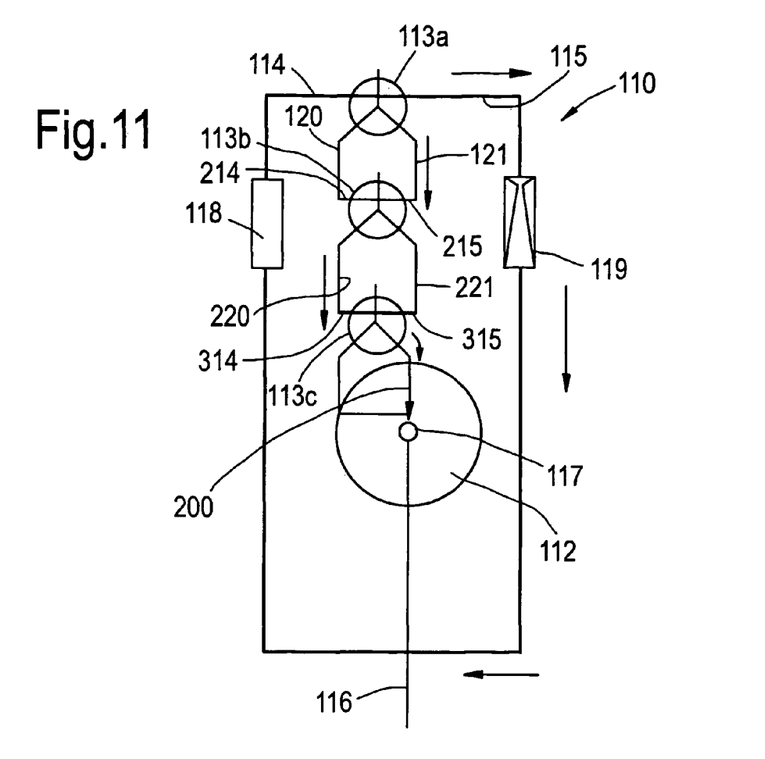
FIG. 11 provides a symbolic illustration of a flow control arrangement utilising a vortex chamber and a cascade of diverter portions and associated flow regulators.

FIG. 11 provides an illustration of such piloted diverter portion operation and configuration in a flow control arrangement 111 in accordance with aspects of the present invention.

Thus, as previously a vortex chamber 112 is associated with a diverter portion cascade comprising diverter portions 113a, 113b, 113c in order to create as indicated above a greater cross flow for control of a through flow in the vortex chamber 112. As will be recalled the cross flow in the last deflector portion 113c of the deflector portion cascade will deflect the through flow into either radial presentation to an outlet 117 or tangential flow and therefore vortex flow to the outlet 117 within the chamber 112. These respective normal and vortex states as described previously will establish high and low resistance to flow through the arrangement 111.

As previously the outlet 117 is associated with an outlet path 116 which in turn is associated with respective flow regulators 118, 119 to control ports 114, 115 of the first diverter portion 113a. In such circumstances a through flow is presented to the diverter portion 113a and the respective cross flow is provided at the control ports 114, 115 as described previously will act upon the through flow in order to cause deflection into respective diverter paths 120, 121 in turn associated with control ports 214, 215 of a second diverter portion 113b whereupon the cross flows presented through the control ports 214, 215 will act upon a through flow to again cause deflection into respective diverter paths 220, 221 associated with respective control ports 314, 315 of a third deflector portion 133c. In the embodiment depicted in FIG. 11 the third deflector portion 113c is the final deflector portion in the cascade but it will be appreciated that more deflector portions may be provided in a cascade if required.

The arrangement 111 allows amplification of the effective cross flow to switch a more powerful through flow. By the three diverter portions 113a, 113b, 113c and the arrowheads shown it will be noted that the arrangement allows in a low pressure ratio state flow through the diffuser or venturi 119 flow regulator which is greater than the flow through the orifice restrictor flow regulator 118. In such circumstances the respective cross flows at the control ports 114, 115 will result in deflection of the through flow for deflection into a path 121 which will then in the second deflector portion 214 cause deflection of the through flow into deflector path 220 which in turn through the cross flow presented through the control port 114 will act upon the through flow to cause deflection into the radial normal state flow condition depicted by arrowhead 200. As described previously with regard to FIG. 1 as pressure ratios increase there will be a switch such that the cross flow presented through the control port 114 will recede and the cross flow presented from the control port 115 will become dominant. In such circumstances at the first deflector portion 113a deflection will be along deflector path 120 with subsequent deflection to path 221 and then to tangential presentation to the chamber 112 by the third deflector portion 113c. In such circumstances there is amplification of the cross flows in order to control a more powerful through flow in the arrangement 111. Switching is caused by differential flow from the first deflector portion 113 as controlled by the respective flow regulators 118, 119. At high supply pressure as indicated the diffuser or venturi arrangement chokes and the control bias in such circumstances switches to the vortex state with higher flow resistance through the arrangement 111.

As indicated above a particular advantage with regard to aspects of the present invention is that there are no moving parts or electronic sensors or controls which inherently may prove unreliable. In such circumstances flow control arrangements in accordance with aspects of the present invention can be more confidently used in safety critical apparatus and in particular gas turbine engines or other situations in aircraft where unreliability is more than inconvenient. Nevertheless, arrangements in accordance with aspects of the present invention will respond to changes in pressure typically with a high degree of rapidity and generally greater than that achievable with moving part valves.

Figure 12:
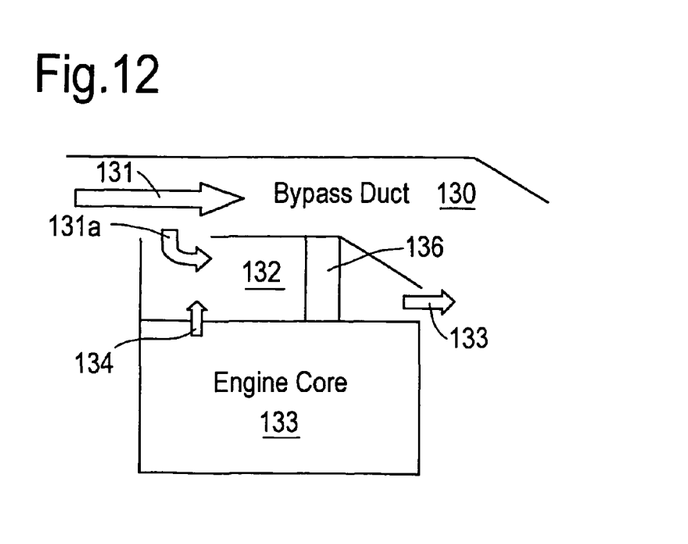
FIG. 12 provides a schematic illustration of part of a gas turbine engine in which a flow control arrangement is provided between a bypass duct and an engine core.
Figure 13:
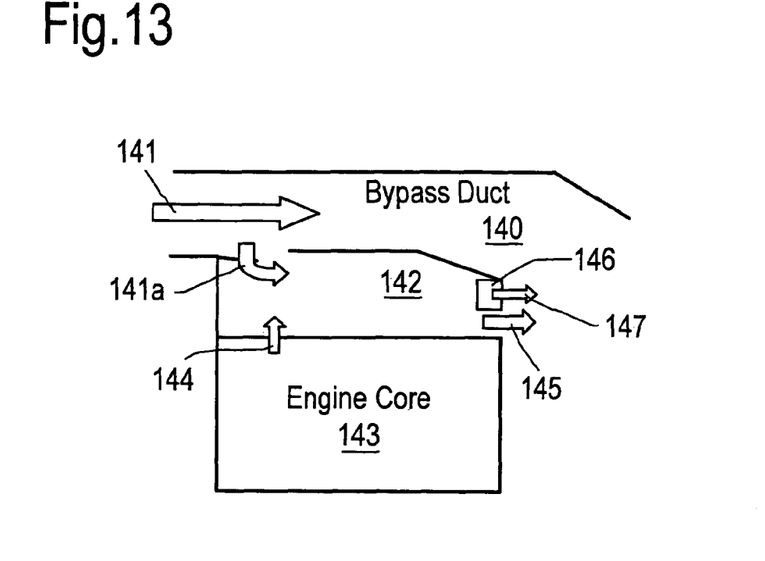
FIG. 13 provides a schematic illustration of a gas turbine engine in which a flow control arrangement is located between a bypass duct and a ventilation path.
Figure 14A:
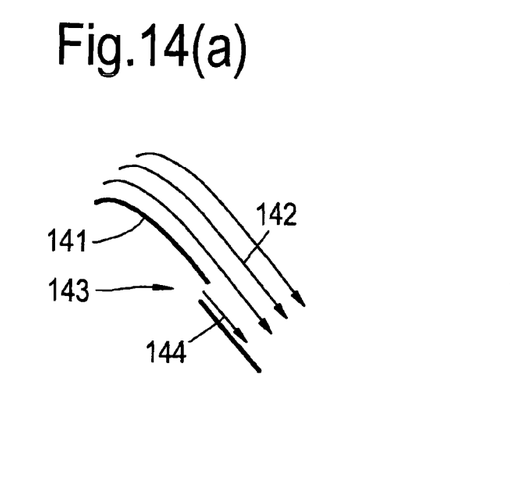
FIG. 14 provides respective schematic illustrations of utilisation of a flow control arrangement in accordance with aspects of the present invention to re-energise a boundary airflow in an aerofoil.
Figure 14B:
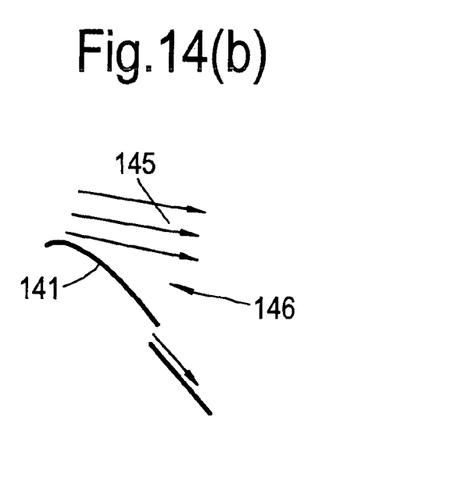

Aspects of the present invention can be utilised in a number of situations where flow control is required with respect to particularly a compressible fluid such as air. Examples of such applications include:

a) Providing reduced flow loss in the event of a burst duct. It will be appreciated there may be situations where a duct or pipe may burst and it would be advantageous to divert fluid flow from such burst situations. A burst pipe will inherently result in a rapid loss in pressure within the pipe and so an increase in pressure ratio across an arrangement in accordance with aspects of the present invention. This increase in pressure ratio may be utilised by the arrangement to increase resistance to further fluid flow along the burst pipe and therefore limit the amount of gas lost through the burst duct or pipe.

b) Controlling pressure within a ventilation zone of a gas turbine engine. It will be understood within a gas turbine engine there are a number of ventilated zones. Typically, compressor fan air is used to ventilate the space but a number of other gas flows can also flow or leak within the ventilation zone. These include leakages and heat exchanger flows. The ventilation zones are subject to a maximum allowable pressure for structural reasons and also to ensure functionality of some of the components contained within the zone. Variations in the flow into the ventilation zone means that the pressure within the zone can vary considerably. By fitting a flow control arrangement in accordance with aspects of the present invention, and in particular an arrangement which switches from high flow resistance to low flow resistance, in parallel tuned to switch at slightly different pressure ratios, an arrangement can be created that reduces its resistance to flow as the flow increases. In such circumstances the arrangement could be used to maintain the ventilation zone at a much more uniform pressure and therefore increase predictability within the gas turbine engine. FIG. 12 provides a schematic illustration of the configuration of such a utilisation of flow control arrangements in accordance with aspects of the present invention. Thus, a bypass duct 130 has a fluid flow 131. A proportion of flow 131a passes into a ventilation zone 132. An engine core 133 also has leakage of some flows 134 into the ventilation zone 132. The respective flows 131a, 134 create a pressure within the zone 132. Providing more stability with regard to the pressure in the zone 132 would be advantageous. It will be understood that there is generally a ventilation or release of fluid flow in the direction of arrowhead 135 through an appropriate orifice. This orifice will be fixed and therefore pressure within the zone 132 will vary dependent upon the leakage levels of flows 131a, 134. By providing flow control arrangements 136 in accordance with aspects of the present invention as described above if the pressure ratios alter considerably more flow resistance can be provided to the orifice and therefore the outlet flow 135 or vice versa and furthermore high to low arrangements in accordance with aspects of the present invention may be utilised in order to dump some fluid flow back into the bypass duct 130.

c) Prevention of compartment over-pressurisation can also be facilitated by aspects of the present invention. The ventilation or other zones tend to have a number of pipes carrying high pressure gas running through them. Should one of these high pressure pipes burst it can cause a rapid pressure rise in the ventilation zone. By utilisation of high to low flow resistance switch configurations of flow control arrangements in accordance with aspects of the present invention it will be understood that an increase in flow capacity out of the ventilation zone can be achieved in order to accommodate the rapid pressurisation as a result of bursting of one or more pipes. Such an arrangement will limit the surge and maximum ventilation zone pressures upon occurrence of a pipe burst. FIG. 13 provides a schematic illustration in which a bypass duct 140 has a bypass flow 141 with a proportion 141a entering a ventilation zone 142. An engine core 143 will also generally have some leakage flows 144 into the ventilation zone 142. In accordance with aspects of the present invention flow control arrangements 146 are provided towards an orifice outlet for the zone 142. In normal operation the zone 142 will have a pressurisation as a result of the flows 141a, 144 with an outlet flow 145. Although there may be changes in the pressurisation within the ventilation zone 142 these are predictable dependent upon the levels of the flows 141a, 144. Should a high pressure pipe within the zone 142 burst however rapid surge pressurisation may occur causing damage. In accordance with aspects of the present invention by provision of flow control arrangement 146 in accordance with aspects of the present invention and with these arrangements switched from a high flow resistance to a low flow resistance the aspect of the outlet orifice can be rapidly increased in order to increase the capacity for outflow as a combination of 145 and an additional flow path shown by arrowhead 147. In such circumstances pressurisation within the ventilation zone 142 should remain within acceptable levels.

d) Active flow control applications can also be provided. There exists a number of situations where flow jets can be used to alter the structure of a gas flow. Notable amongst these are re-energising boundary airflow on aerofoils using jets to increase the mixing and reduce the noise from the engine final nozzle and using jets to reduce over-tip leakage above blading. FIG. 14a illustrates schematically re-energising boundary layers of an aerofoil through jetting. In such circumstances an aerofoil 241 has a mainstream flow 242 over it. A low to high flow resistance flow control arrangement 243 in accordance with aspects of the present invention is provided in order to create a small control flow to re-energise boundary layers of the main flow 242 in order to keep such flow attached to the aerofoil 241 in use. The flow control presented through the arrangement in accordance with aspects of the present invention is depicted by arrowhead 244. The flow control arrangement 243 is associated with a high pressure source in order to achieve the active flow control in accordance with aspects of the present invention. FIG. 14b illustrates a similar arrangement in which the aerofoil 241 has a mainstream flow 245 which is detached from the aerofoil. In such circumstances by utilisation of the flow control arrangement 243 in accordance with aspects of the present invention associated with a high pressure source it will be understood that the pressure rise in the low energy re-circulating flow 246 will cause switching of the flow control arrangement until the boundary layer 244 is re-energised and the mainstream flow re-attaches. In essence the flow control arrangement supplements airflow in the region 244 in order to avoid creation of a pressure compression in this region 246 until re-attachment of the boundary layer.

Figure 15:
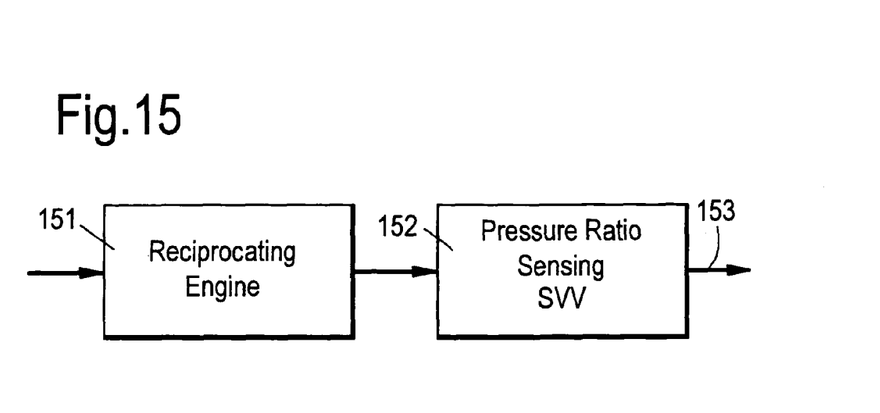
FIG. 15 is a schematic illustration of utilisation of a flow control arrangement in accordance with aspects of the present invention within a reciprocating engine.

In the above circumstances it will be appreciated that aspects of the present invention may be utilised with regard to, as indicated, reducing flow losses as a result of burst ducts or pipes as well as preventing over-pressurisation as a result of such bursting or other reasons. Further applications may also include active flow control over an aircraft wing in a similar fashion to that described above with regard to aerofoil 241. Further aspects of the present invention may be utilised with respect to modulating back pressure in a reciprocating engine. At low speed in a reciprocating engine it is desirable to increase the back pressure from the exhaust system. As engine speed increases a low back pressure is desirable to allow high through flow of combustion products. Such variation between higher back pressure at low speeds and lower back pressure at high speeds is conventionally achieved through moving parts valves but as indicated this can cause lag as well as unreliability problems. As depicted with regard to FIG. 15 a reciprocating engine 151 can present a fluid flow, that is to say an exhaust flow to a flow control arrangement 152 in accordance with aspects of the present invention. The flow control arrangement will be of the type with high flow resistance switched to low flow resistance such that initially a higher back pressure will be presented to the reciprocating engine whilst as the pressure from that engine 151 increases the arrangement 152 will switch to low pressure resistance such that an exhaust flow 153 will more closely match desirable operating conditions.

Flow control arrangements in accordance with aspects of the present invention may be utilised in a wide range of environments including as described above with regard to a gas turbine engine. Flow control arrangements as indicated above are fluidic in terms of their valve function and therefore avoid moveable parts and control regime reliability problems. The arrangement may be utilised with respect to pressurised gas pipes in order to maintain pressurisation or achieve more uniformity with respect to such pressurisation despite wear and tear and progressive leakage or rapid rupture.

Modifications and alterations to aspects of the present invention will be appreciated by those skilled in the art. For example as described with regard to FIG. 16 the respective flow regulators utilised in association with control ports are dependent upon the particular configuration and type. Generally orifice restrictor or diffuser/venturi or vortex throttle type flow restrictors are typically used. The open aspects and other features of these flow restrictors generally will provide in combination with biasing of the vortex chamber or configuration of an opposed flow regulator will achieve switching between high and low flow restriction. Generally monostable or bi-stable flow control arrangements will use different flow regulators, that is to say orifice restrictor, diffuser/venturi or vortex throttle. However, these flow restrictors to a certain extent are dependent upon their configuration and size. In such circumstances flow regulators of the same type but of different configuration and size may be presented on either side of the opposed control ports in order to provide different responses to the through flows and so switching between high and low flow restriction in the flow control arrangements.

We claim:

1. A flow control arrangement having an inlet and an outlet and comprising a vortex chamber and a diverter portion to divert a through flow in use to enter the vortex chamber either tangentially or radially dependent in use upon a cross flow from a control port, wherein the control port is associated with a flow regulator also coupled to the outlet to receive a proportion of the through flow and present the proportion of the through flow as the cross flow from the control port, the flow regulator configured to define flow conditions when the diverter portion switches the through flow between substantially tangential and substantially radial presentation to the vortex chamber.

2. An arrangement as claimed in claim 1 wherein the flow condition is a pressure ratio between the inlet and the outlet.

3. An arrangement as claimed in claim 1 wherein the flow regulator comprises an open flow regulator such as a diffuser or orifice restrictor or vortex throttle.

4. An arrangement as claimed in claim 1 wherein the flow regulator is of a fixed configuration.

5. An arrangement as claimed in claim 1 wherein the flow regulator may be of a variable configuration.

6. An arrangement as claimed in claim 1 wherein the diverter portion incorporates two control ports.

7. An arrangement as claimed in claim 6 wherein the control ports are opposite each other.

8. An arrangement as claimed in claim 6 wherein one or both of the control ports may be electively closed or blocked.

9. An arrangement as claimed in claim 1 wherein the diverter portion comprises a cascade of individual diverter portion elements with control ports interlinked.

10. An arrangement as claimed in claim 9 wherein each diverter portion includes two control ports, one control port in each diverter portion is interlinked with only one control port in another diverter portion in the cascade.

11. An arrangement as claimed in claim 9 wherein each diverter portion in a cascade sequence from an inlet towards the vortex chamber has successively greater flow capacity.

12. An arrangement as claimed in claim 1 wherein the control port is configured to provide pulsed cross flow.

13. An arrangement as claimed in claim 1 wherein the control port is configured to provide a continuous cross flow.

14. An arrangement as claimed in claim 1 wherein the cross flow is forced to become incident upon the through flow.

15. An arrangement as claimed in claim 1 wherein the cross flow is drawn outwardly of the control port to draw or suck upon the through flow.

16. An arrangement as claimed in claim 1 wherein the vortex chamber is configured in terms of incident position for the diverter portion to provide a bias towards a substantially tangential or substantially radial presentation of the through flow to the outlet.

17. A gas turbine engine incorporating a flow control arrangement as claimed in claim 1 wherein the flow control arrangement is between a bypass duct and an engine core.

18. A gas turbine engine incorporating a flow control arrangement as claimed in claim 1 wherein the flow control arrangement is between a bypass duct and a ventilation path within the gas turbine engine.

19. A gas turbine engine incorporating a flow control arrangement as claimed in claim 1 wherein the flow control arrangement is between a high pressure source and a flow over an aerofoil of a gas turbine engine.

20. A reciprocating engine including a flow control arrangement as claimed in claim 1 wherein the flow control arrangement is between an exhaust for the reciprocating engine and an exhaust conduit from the reciprocating engine.

* * * * *